United States Patent
Nelluri (10) Patent No.: US 11,423,499 B2
(45) Date of Patent: Aug. 23, 2022

(54) LOGISTICS SENSORS FOR SMART CONTRACT ARBITRATION

(71) Applicant: Bank of America Corporation, Charlotte, NC (US)

(72) Inventor: Govinda Rajulu Nelluri, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 545 days.

(21) Appl. No.: 16/446,731

(22) Filed: Jun. 20, 2019

(65) Prior Publication Data

US 2020/0402190 A1    Dec. 24, 2020

(51) Int. Cl.
  *G06Q 50/18* (2012.01)
  *H04W 4/33* (2018.01)
  *H04W 4/38* (2018.01)

(52) U.S. Cl.
  CPC ......... *G06Q 50/188* (2013.01); *G06Q 50/182* (2013.01); *H04W 4/33* (2018.02); *H04W 4/38* (2018.02)

(58) Field of Classification Search
  CPC ..... G06Q 50/188; G06Q 50/182; H04W 4/33; H04W 4/38
  See application file for complete search history.

(56) References Cited

U.S. PATENT DOCUMENTS

| | | | |
|---|---|---|---|
| 6,972,682 B2 | 12/2005 | Lareau et al. | |
| 7,049,963 B2 | 5/2006 | Waterhouse et al. | |
| 7,414,571 B2 | 8/2008 | Schantz et al. | |
| 7,898,411 B2 | 3/2011 | Brosius | |
| 8,310,363 B2 | 11/2012 | Breed | |
| 10,115,068 B2 | 10/2018 | Vivier | |
| 2019/0012637 A1 | 1/2019 | Gillen | |
| 2019/0355025 A1* | 11/2019 | Yang | G06Q 20/308 |
| 2020/0019931 A1* | 1/2020 | Prabhakar | H04W 4/70 |
| 2020/0134711 A1* | 4/2020 | Dawson | H04L 9/0637 |
| 2020/0213193 A1* | 7/2020 | Newell | H04L 67/12 |
| 2020/0311666 A1* | 10/2020 | Gray | H04L 9/0869 |
| 2020/0387893 A1* | 12/2020 | Maim | H04L 9/3234 |

OTHER PUBLICATIONS

1. F. Lamberti, V. Gatteschi, C. Demartini, M. Pelissier, A. Gomez and V. Santamaria, "Blockchains Can Work for Car Insurance: Using Smart Contracts and Sensors to Provide On-Demand Coverage," in IEEE Consumer Electronics Magazine, vol. 7, No. 4, pp. 72-81, Jul. 2018, doi: 10.1109/MCE.2018.2816247 (Year: 2018).*

\* cited by examiner

*Primary Examiner* — Carrie S Gilkey
(74) *Attorney, Agent, or Firm* — Weiss & Arons LLP (57) ABSTRACT

Systems and methods for electronic arbitration of a smart contract in response to environmental sensor data are provided. An environmental sensor signal may include an electronic sensor identifier. A signal context matcher may process the sensor signal at the IOT edge and route sensor signal data to a remote electronic arbitrator. The arbitrator may identify a smart contract on a distributed ledger based on the sensor signal data. The arbitrator may identify a smart contract modification based on the sensor signal data. The arbitrator may instruct a smart contract reviser to validate and execute modified smart contract code corresponding to the smart contract modification using DLT protocols.

12 Claims, 5 Drawing Sheets

LOGISTICS SENSORS FOR SMART CONTRACT ARBITRATION

FIELD OF TECHNOLOGY

Aspects of the disclosure relate to smart contract arbitration. Specifically, aspects of the disclosure relate to electronic arbitration of a smart contract in response to sensor data from a mobile edge device.

BACKGROUND

A relationship between transaction partners may include a smart contract, also known as a self-executing contract. The smart contract may facilitate, verify and enforce the performance of an agreement or transaction. The smart contract may include a set of rules under which the parties agree to interact with each other. Smart contract logic may operate on an "if-then" principle. If the predefined rules are met, the agreement may be automatically enforced.

Smart contract code may run on a distributed electronic ledger. Each node in the distributed ledger technology ("DLT") network may validate and execute the smart contract code.

Assets addressed in a smart contract may undergo changes before execution or during the term of the contract. For example, where the contract involves a physical product, the asset may be damaged in transport during the term of the contract. Similarly, where the contract involves a financial instrument, the asset may lose value during the term of the contract.

Changes to the asset may not be apparent until the time of delivery. The if-then logic of the smart contract may limit or preclude mitigation or remediation options. In some cases, the smart contract may execute upon delivery of the asset in spite of the change in condition. In some cases, the contract may be voided entirely due to the change in condition of the asset.

It would be desirable to electronically monitor the real-time condition of an asset addressed by a smart contract. It would be desirable to minimize the latency and high bandwidth requirements typically associated with continuous monitoring.

It would further be desirable to electronically identify a modification to a smart contract based on the real-time sensor data regarding condition of the asset and implement the modification through DLT network protocols.

SUMMARY OF THE DISCLOSURE

Systems and methods for electronic arbitration of a smart contract in response to sensor data are provided.

The system may include a mobile edge device. The mobile edge device may include an environmental sensor. The sensor may transmit a signal. The sensor may transmit a signal in response to measuring an environmental parameter. The sensor signal may include a sensor identifier.

The system may include an edge gateway. The edge gateway may include a signal context matcher configured to receive a sensor signal and identify a transaction party associated with the sensor.

The system may include a computer system running a distributed electronic ledger. The computer system may be a node on a DLT network. The signal context matcher may route sensor signal data to the DLT node.

The DLT node may include an electronic arbitrator. In some embodiments, the DLT node may be in communication with a remote electronic arbitrator. The arbitrator may be configured to identify a smart contract based on the sensor signal data. The arbitrator may be configured to identify a modification to the smart contract based on the sensor signal data.

The DLT node may include an electronic contract reviser. The reviser may be configured to validate and execute a modified smart contract in response to an instruction from the arbitrator. The reviser may generate a data record and append the data record to the distributed ledger in accordance with DLT network protocols.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Systems and methods for electronic arbitration of a smart contract in response to sensor data are provided.

An Internet of Things ("IOT") may be defined as a pervasive and ubiquitous network that enables monitoring and control of the physical environment by collecting, processing, and analyzing the data generated by nodes (e.g., smart objects). Examples of such nodes include refrigerators, lights, smartphones, smartwatches, computers, laptops, tablets, sinks, hot water heaters, coffee machines, ovens, vehicles, thermostats and any other suitable devices. The diverse nature and large volume of data collected by numerous interconnected nodes on an IOT potentially enables unique functionality and operational opportunities.

Each IOT node may represent an IOT device. Each node may include two or more nodes. A node may include a sensor. Sensors may include devices that detect changes in a physical or virtual environment. For example, sensors may measure audio, rainfall, temperature, humidity, pressure or water levels. Sensors may measure electronic network traffic, electronic signals (e.g., input or output) or frequency of user logins from within a predefined geographic area.

In some embodiments a node may include an actuator. The actuator may be configured to implement a pre-defined action in response to a change detected in the environment. For example, a thermostat may detect a rise in environmental temperature and may trigger a cooling protocol. In some embodiments, the actuator may transmit a signal in response to detecting a change in the environment and may receive an instruction to implement an action.

Sensors may be any suitable size. For example, sensors may be a few millimeters in size. Sensors may be deployed in a wide variety of locations. For example, sensors may be deployed in shipping containers, transport vehicles, orchards, industrial plants, clothing, refrigeration units or smart phones. Sensors may be relatively inexpensive and have low energy consumption. Sensors may "sense" two or more stimuli or environmental changes.

Captured data may be transmitted using any suitable transmission method. For example, data captured by a sensor may be extracted by a mobile phone. Sensors may leverage a communication link provided by a mobile phone to communicate captured data to another node.

Each sensor may be assigned a unique identifier (ID). For example, sensors may be identified by one or more radio frequency identification ("RFID") tags. The RFID tag may be stimulated to transmit identity information about the sensor or any other information stored on the RFID tag.

Captured data may be transmitted by the sensor and processed away from the location of the sensor that captured the data. For example, captured data may be transmitted from one node to another node until the captured data reaches a data repository.

Sensors may be positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. In some embodiments, the captured data may be organized by the data repository.

In some embodiments, sensor data may be transmitted continuously. In some embodiments, sensor data may be transmitted on a periodic schedule. In some embodiments, sensor data may be transmitted in response to an environmental change detected by the sensor.

The invention may include an IOT signal context matcher component. The signal context matcher component may be a software component.

The signal context matcher may receive data from an environmental sensor. The sensor data may include metadata associated with the sensor, such as the sensor owner or the sensor location. The metadata may be encoded in an RFID tag or conveyed by any suitable method. The signal context matcher may map the sensor data against its business meaning. For example, the signal context matcher may receive a signal from a temperature sensor in a refrigeration unit indicating that the cooling system is malfunctioning. The signal context matcher may identify the owner of the unit. The signal context matcher may identify an asset being transported in the unit. The signal context matcher may determine that the change in conditions for the asset threatens execution of a trade relationship involving a particular buyer and a particular seller.

The signal context matcher may include predefined commands associated with various use case contexts. The commands may include one or more routing parameters associated with the sensor data. The signal context matcher may route the sensor data to a central platform based on the commands.

The sensor data may be processed prior to routing using edge computing. Edge computing is a distributed, open IT architecture that features decentralized processing power. Edge data may be processed by a local computer or server rather than being transmitted to a data center, minimizing latency and internet bandwidth usage.

The sensors may be embodied in one or more mobile edge devices. The sensors may be mobile edge devices. The signal context matcher may be installed on an edge gateway. The edge gateway may route information from the IOT edge to a central platform or cloud. Edge computing may reduce latency in real-time processing of sensor data and allow the signal context matcher to quickly and efficiently identify a trade relationship affected by changes to the condition of an asset.

The trade relationship may include a smart contract. A smart contract is a self-executing contract. The smart contract code may facilitate, verify and enforce the performance of an agreement or transaction. The smart contract may include a set of rules under which the parties agree to interact with each other. The smart contract may operate using if-then logic. If the pre-defined rules are met, the agreement may be automatically enforced.

The smart contract may run on a distributed electronic ledger. A distributed electronic ledger may store records in any suitable format. For example, records may be stored sequentially as they are generated, one after the other in a continuous ledger. Records may be stored in blocks, such as in a blockchain.

The distributed ledger may be a public or unpermissioned distributed ledger. A public distributed ledger does not have restriction on who may participate in the establishing a consensus for adding a new record.

The distributed ledger may be a private or permissioned distributed. A private distributed ledger has restrictions on who may participate in the establishing a consensus for adding a new record.

The distributed ledger may utilize a combination of private and public participation in establishing a consensus. For example, the distributed ledger may require a threshold number of private and/or public votes before recording a transaction on the distributed ledger. Utilization of private entities may allow for achieving a consensus (or rejection) of a transaction faster than wholly public distributed ledgers.

The distributed ledger may be a blockchain. Records stored in a blockchain are organized in blocks. Each block may include multiple records. The blocks are linked to one another and secured using cryptography.

The distributed ledger may link details of the smart contract from an external repository. The distributed ledger may link transaction partners that participate in the smart contract. The smart contract may be replicated on multiple nodes of a distributed ledger technology (DLT) network. Smart contract format and content may be based on the proprietary structure of the DLT network. Smart contract validation and execution may be based on DLT network protocols.

The signal context matcher may route sensor data to an electronic smart contract arbitrator ("the arbitrator"). In some embodiments, the arbitrator may extract the information from the context matcher. The arbitrator may receive sensor data from the signal context matcher on a periodic schedule. The arbitrator may extract information from the signal context matcher on a periodic schedule. The sensor data may include information about the sensor environment, information about one or more transaction partners, information about the type of transaction, information about asset or any suitable information.

The arbitrator may be installed on a central platform or any suitable location. The arbitrator may be installed on a computer system running a distributed electronic ledger. The arbitrator may be installed across one or more nodes of a DLT network. The arbitrator may be associated with an entity. The entity may be a participant in the DLT network. The entity may be a financial institution.

The arbitrator may identify a smart contract based on sensor data received from the signal context matcher. The arbitrator may use the information about the transaction partners and about the asset to identify an existing smart contract associated with the trade relationship.

The arbitrator may identify a modification to the smart contract based on sensor data received from the signal context matcher. The signal context matcher may determine real-time condition of an asset based on the sensor signal data. The smart contract modification may be based on sensor data regarding condition of the asset. The smart contract modification may include a new contingency based on the current state of the asset. For example, in the case of the detected cooling system malfunction in the refrigeration unit, there is a chance that goods will arrive spoiled. The arbitrator may identify a smart contract modification that includes a partial payment in the event that specific percentage of the goods arrive in usable condition. The arbitrator may identify a smart contract modification that includes an opportunity to proceed with the contract if the seller can repair the refrigeration unit in transit.

The arbitrator may identify a new contract term. The arbitrator may identify a modification to an existing contract term. The modification may change one or more actions that result from the contract. For example, the modification may change the amount of the payment that is transmitted to the seller. The arbitrator may include a library of predefined contract terms that are associated with different environmental scenarios.

In some embodiments, the arbitrator may transmit the new or modified contract term to the transaction partners for pre-approval. In some embodiments, the arbitrator may notify the transaction partners of the updated asset condition and receive a proposed modification from one or more of the transaction partners in response to the updated asset information.

In some embodiments, the sensor data may indicate no change in the condition of the asset. In some embodiments, the arbitrator may identify a contract modification that includes a bonus for excellent performance in maintaining the condition of the asset The contract modification identified by the arbitrator may be implemented by a smart contract reviser ("the reviser"). The reviser may be installed on a computer system running a distributed electronic ledger. The reviser may be installed across one or more nodes of a DLT network. The reviser may be configured based on specific DLT network protocols. The reviser may be programmed to adapt to a plurality of different DLT networks.

The reviser may receive an instruction from the arbitrator. The reviser may generate smart contract code that corresponds to the smart contract modification identified by the arbitrator. The code may be specific to a DLT network. The reviser may modify the smart contract to replace an existing contract term. The reviser may modify the smart contract to add a new contract term.

The reviser may validate and execute the modified smart contract. The reviser may generate a data record and append the data record to the distributed ledger in accordance with DLT network protocols. The modified smart contract may be automatically replicated to the transaction partners through the DLT network.

The reviser may use any suitable method to modify the smart contract and update the DLT network. In some embodiments, the reviser may create a new contract at a different address on the network and migrate the original contract information to the new address. In some embodiments the reviser may generate a second smart contract to address a contingency identified by the sensor data. For example, in the case of sensor data identifying a refrigeration failure, a second contract may address repairs to the unit during transport.

In some embodiments, the reviser may be installed on an extended recognition node as described in U.S. patent application Ser. No. 16/011,852 filed on Jun. 19, 2018 and titled SYSTEM FOR IMPLEMENTING EXTENDED RECOGNITION MECHANISM IN A DISTRIBUTED LEDGER NODE, which is hereby incorporated by reference herein in its entirety. The extended recognition node may be a node in a distributed ledger network configured to simultaneously perform DLT functions while also performing information server and data management functions with respect to outside networked systems. The extended recognition ledger node may interact with static data such as a library of smart contract modifications. The extended recognition ledger node may interact with an electronic arbitrator. The extended recognition node may include an electronic arbitrator program. The extended recognition ledger node may interact with customer financial data stored in entity legacy systems.

In some embodiments, the asset may be a financial instrument. Edge devices may monitor any suitable parameter of the financial instrument. For example, an edge device may monitor the value of the financial instrument. A signal context matcher installed on an edge gateway may receive the real-time asset data from the edge device and route the asset data to the electronic smart contract arbitrator. The arbitrator may identify a smart contract associated with the financial instrument. The arbitrator may identify a smart contract modification based on data received from the signal context matcher. The arbitrator may instruct a smart contract reviser to validate and execute new smart contract code corresponding to the contract modification. The smart contract reviser may generate a data record and append the data record to the distributed ledger in accordance with DLT network protocols. The modified smart contract may be replicated to the transaction partners through the DLT network.

Apparatus and methods in accordance with this disclosure will now be described in connection with the figures, which form a part hereof. It is understood that other embodiments may be utilized, and that structural, functional, and procedural modifications may be made without departing from the scope and spirit of the present disclosure.

For the sake of illustration, the invention will be described as being performed by a "system." The system may include one or more features of the apparatus and methods that are shown or described herein and/or any other suitable device or approach. The system may be provided by an entity. The entity may be an individual, an organization or any other suitable entity.

Illustrative method steps may be combined. For example, an illustrative method may include steps shown in connection with another illustrative method. The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
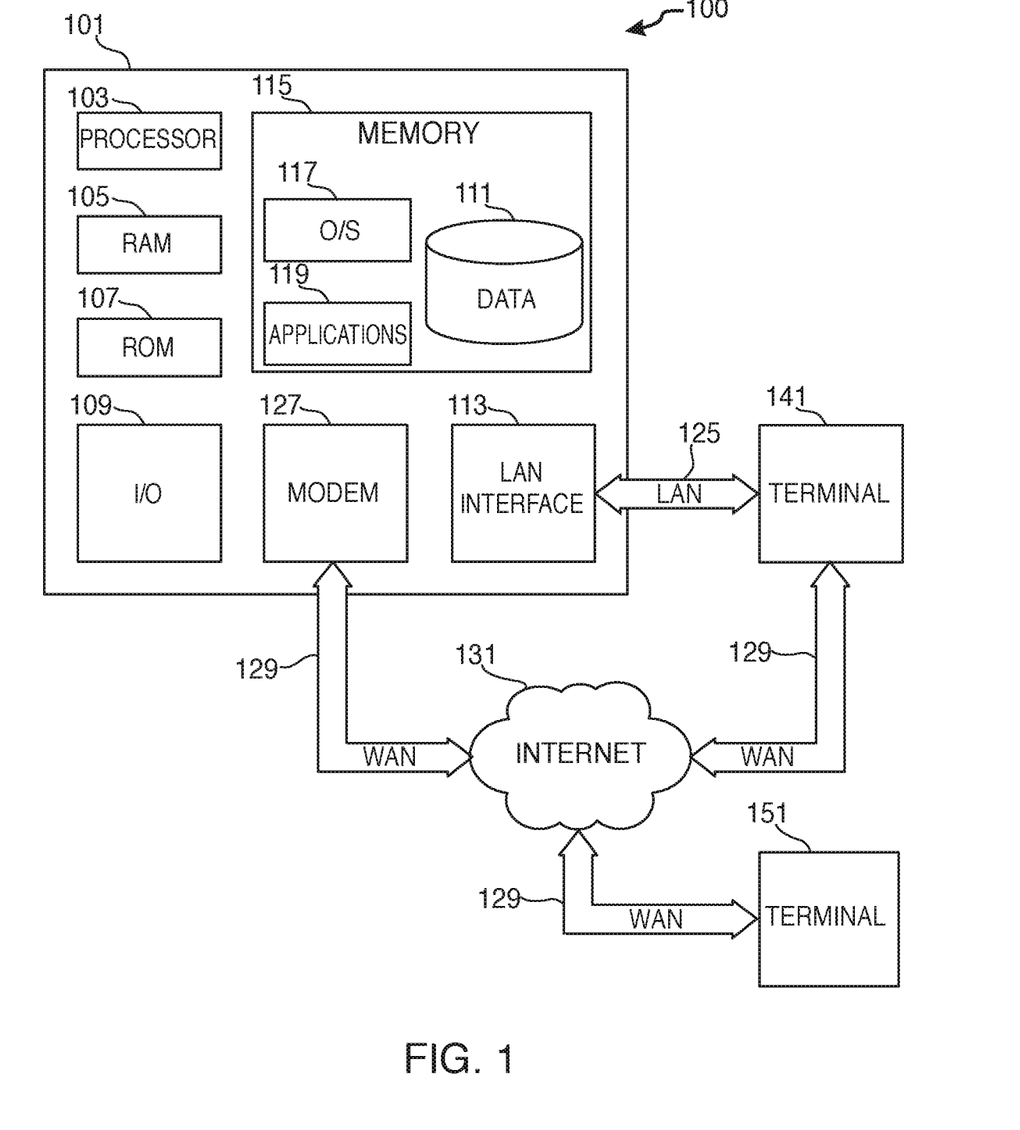
FIG. 1 shows an illustrative system in accordance with principles of the invention.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. The LAN may link a plurality of edge computing devices. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

Computer 101 may be an edge computing device. Terminals 141 and 151 may be edge computing devices. LAN 125 may be an edge network. LAN interface 113 may be an edge gateway.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to collecting or processing sensor data. The various tasks may be related to updating a distributed electronic ledger. Applications may include an electronic smart contract arbitrator, an electronic smart contract reviser or any other suitable application.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
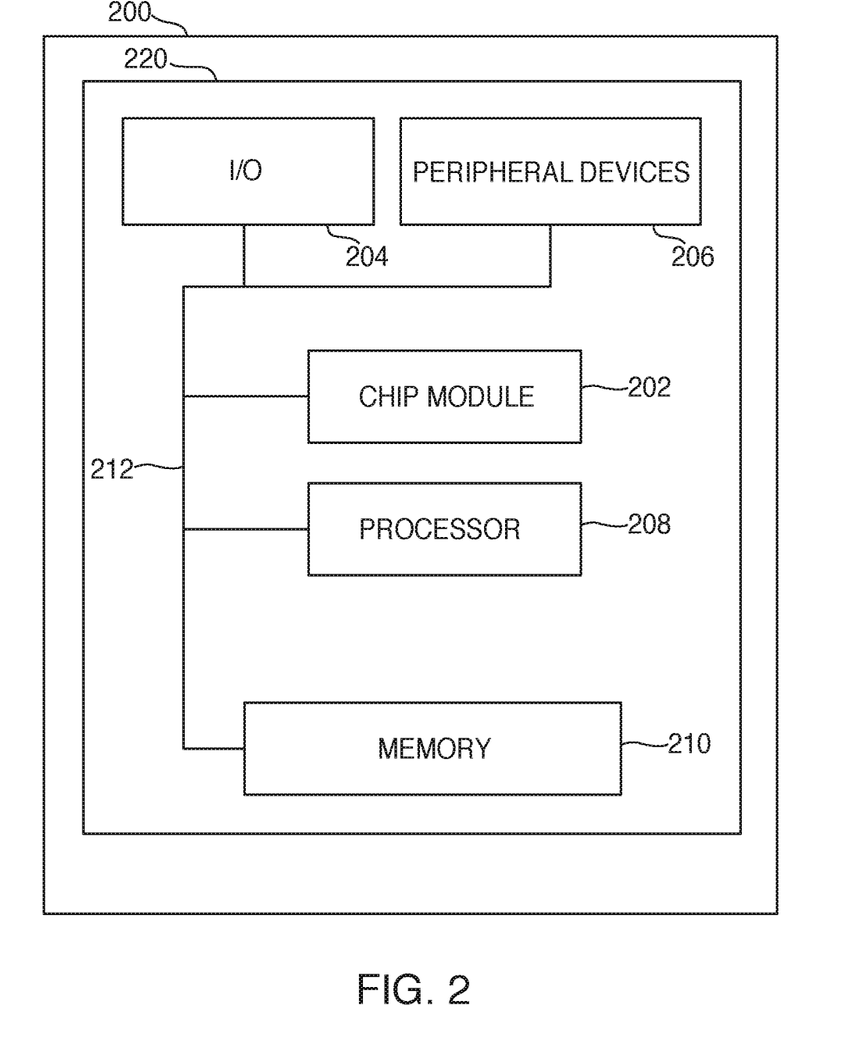
FIG. 2 shows an illustrative apparatus in accordance with principles of the invention.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
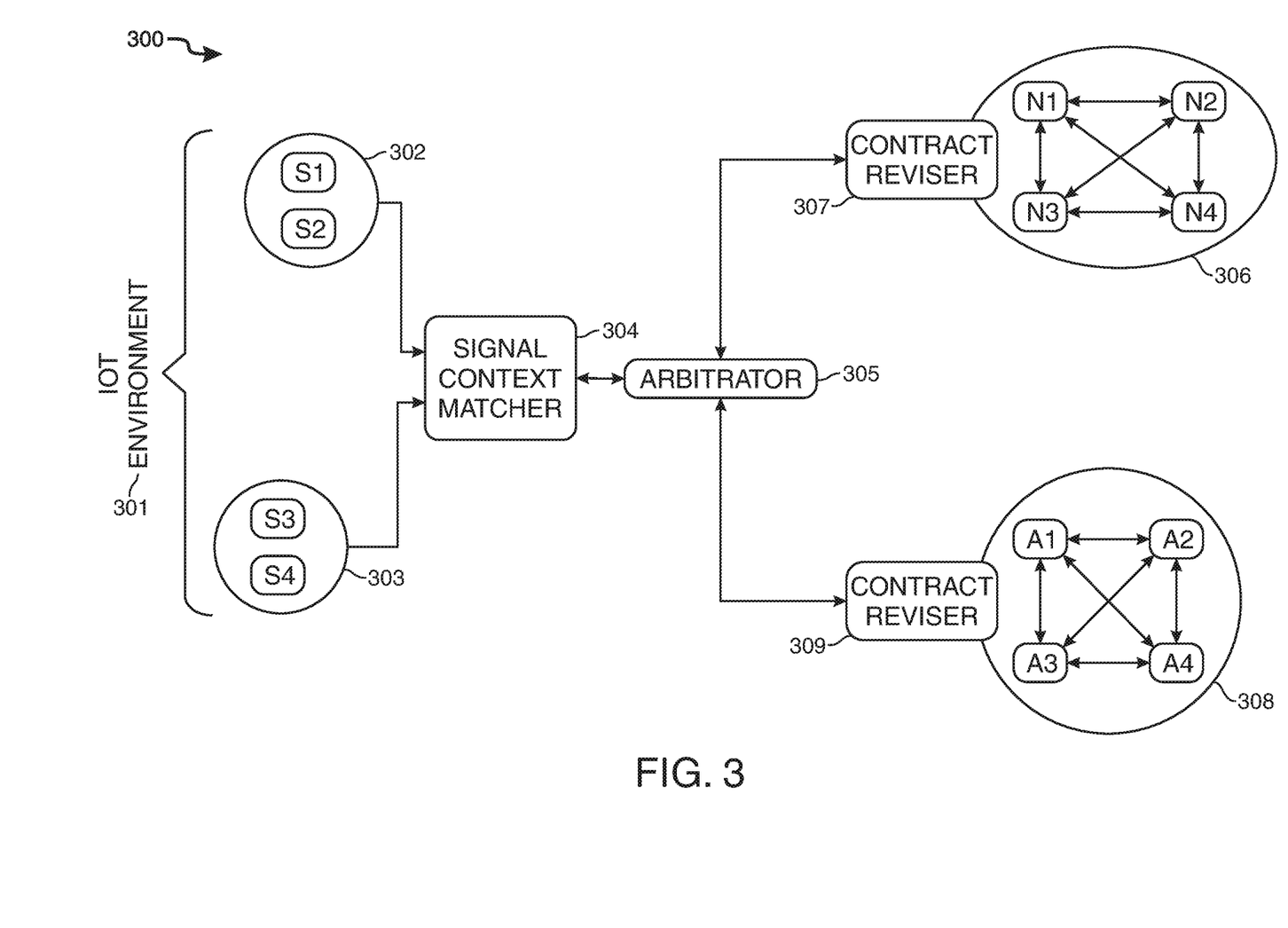
FIG. 3 shows an illustrative process flow in accordance with principles of the invention.

FIG. 3 shows illustrative process 300. IOT environment 301 may include mobile edge devices 302 and 303. Mobile edge device 302 may include sensors 1 and 2. Mobile edge device 303 may include sensors 3 and 4. For example, mobile edge device 302 may be shipping container equipped with a temperature sensor and a humidity sensor.

Mobile edge devices 302 and 303 may transmit sensor data to signal context matcher 304. Signal context matcher 304 may be installed on an edge gateway.

The sensor data may include data and metadata. Signal context matcher 304 may receive metadata via a bar code, an RFID tag or any suitable method. The metadata may include a unique identifier. The metadata may include geographical location data. The metadata may include information relating to the owner of the mobile edge device. The metadata may include information relating to the goods being transported. For example, the mobile edge device may transmit sensor data indicating that the temperature within the shipping container has exceeded a pre-determined threshold. The mobile edge device may transmit metadata including the owner of the shipping container and the contents of the container. The signal context matcher may recognize that perishable goods under the control of a particular shipping company, and being sold by party A to party B, are at risk of spoiling.

Signal content matcher 304 may route the mobile edge device data and metadata to electronic arbitrator 305. arbitrator 305 may be an application hosted on a central platform. In some embodiments, signal content matcher 304 may be installed on the same platform as arbitrator 305 and may communicate by near field communication (NFC).

Arbitrator 305 may be installed on a node of a DLT network. Arbitrator 305 may be in communication with a node of a DLT network 306 or 308.

Using sensor data and metadata received from signal context matcher 304, arbitrator 305 may identify a smart contract on DLT network 306. Arbitrator 305 may identify a smart contract modification in response to the detected change in the physical environment of the asset. For example, if sensor data indicates a possibility that the goods will be spoiled, arbitrator 305 may identify a price abatement to take effect in the event that a particular percentage of the goods arrive damaged. Arbitrator 305 may include a library of contract modifications that are selected based on sensor data received from the signal context matcher.

DLT network 306 may include a plurality of distributed nodes. For illustrative purposes four exemplary nodes are shown (N1-N4). Smart contract reviser 307 may be installed on one or more nodes of DLT network 306. Arbitrator 305 may transmit contract modification instructions to smart contract reviser 307.

Contract reviser 307 may execute and validate smart contract code corresponding to the instructions from arbitrator 305. Contract reviser 307 may be configured for the DLT protocols associated with DLT network 306. The modified smart contract may be automatically replicated to the transaction partners through DLT network 306.

Arbitrator 305 may interface with multiple DLT networks. Arbitrator 305 may receive additional transaction information from signal context matcher 304 and may identify a second smart contract on DLT network 308. Arbitrator 305 may identify modifications to the second smart contract.

Figure 4A:
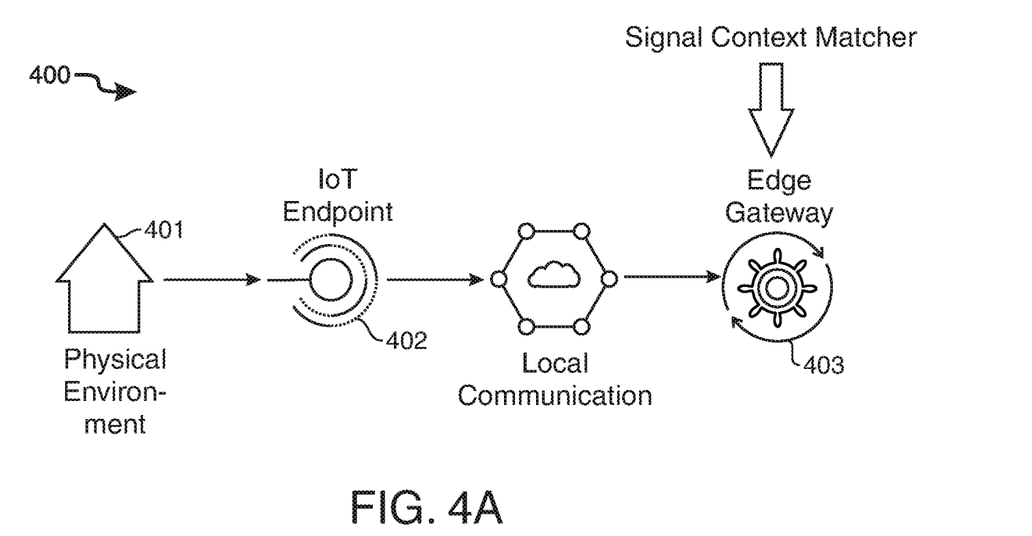
FIGS. 4A and 4B show two parts of an illustrative process flow in accordance with the principles of the invention.
Figure 4B:
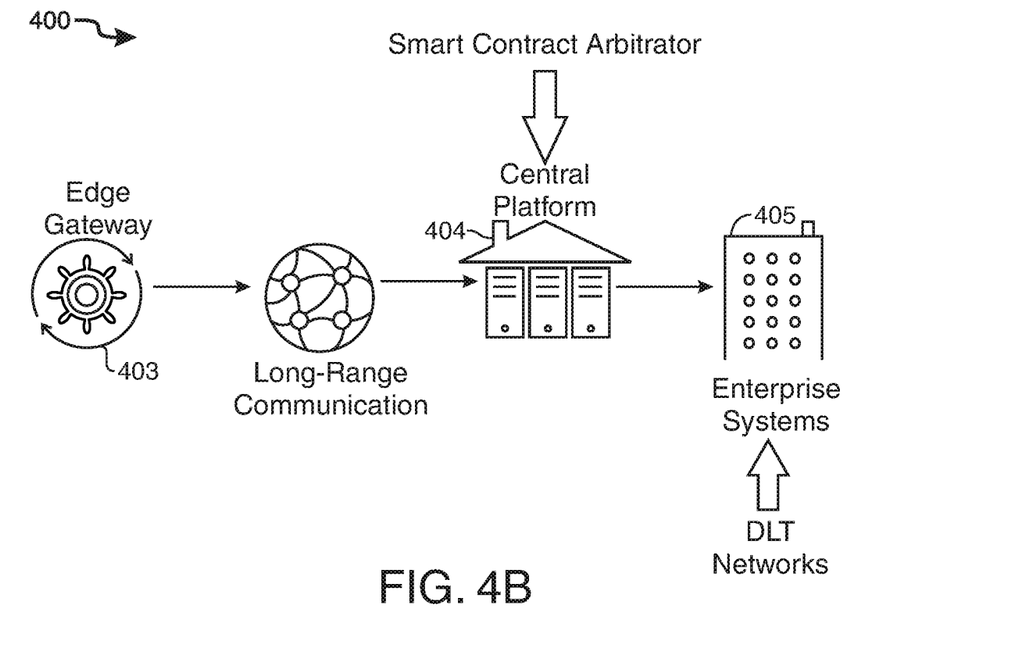

FIGS. 4A and 4B show two parts of illustrative process 400. Process 400 illustrates a system configured to modify smart contract code based on environmental sensor data. Process 400 may include one or more elements from process 300, shown in FIG. 3.

FIG. 4A shows events occurring at the IOT edge. Physical environment 401 includes sensors configured to detect changes in the physical environment. IOT endpoint 402 may collect and process sensor data from the physical environment. The sensor data may be transmitted locally to edge gateway 403. Edge gateway 403 may determine routing based on the sensor data. Edge gateway 403 may include a signal context matcher. Relying on local communication and edge processing may reduce the bandwidth requirements and latency typically associated with continuous monitoring of a physical environment.

FIG. 4B shows events occurring after the edge data is routed to a central server or cloud. The signal context matcher installed on edge gateway 403 may transmit the sensor data to central platform 404. Central platform 404 may host a smart contract arbitrator. Based on the sensor data transmitted by edge gateway 403, the smart contract arbitrator may identify a smart contract associated with the transaction partners and the asset. The arbitrator may identify a smart contract modification in response to a change in the physical environment of the asset. The smart contract modification may be transmitted to a contract reviser installed on enterprise system 405. Enterprise system 405 may be running a distributed ledger. Enterprise system 405 may be a node on the DLT network. The smart contract reviser may generate smart contract code corresponding to the smart contract modification identified by the arbitrator. The smart contract reviser may validate and execute the modified smart contract on the DLT network. The smart contract reviser may validate and execute smart contract code corresponding to the smart contract modification transmitted by the arbitrator. The smart contract reviser may generate a data record and append the data record to the distributed ledger in accordance with DLT network protocols.

Figure 5A:
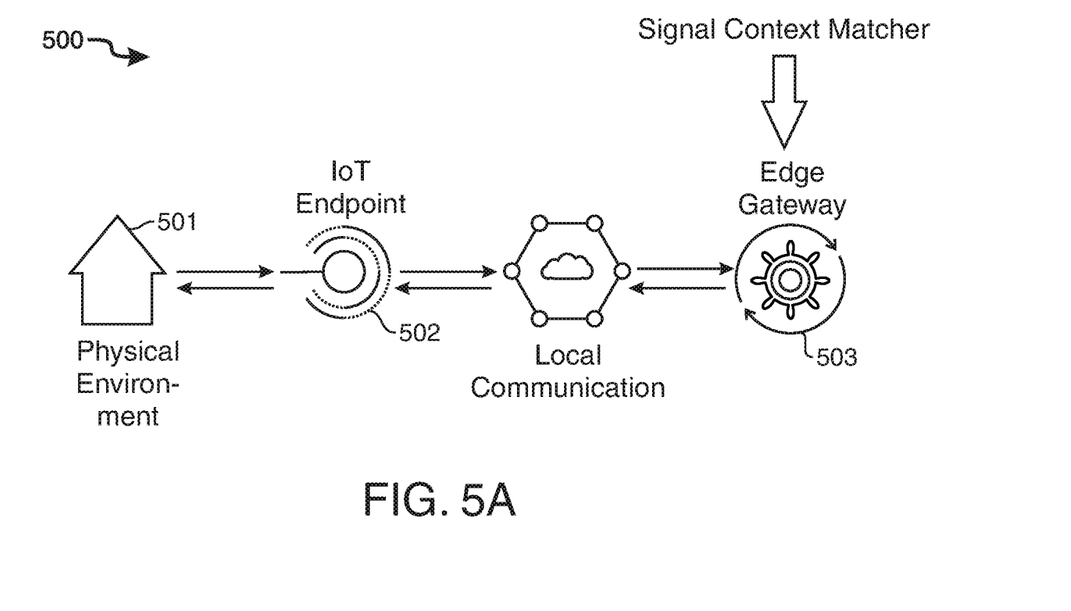
FIGS. 5A and 5B show two parts of an illustrative process flow in accordance with the principles of the invention.
Figure 5B:
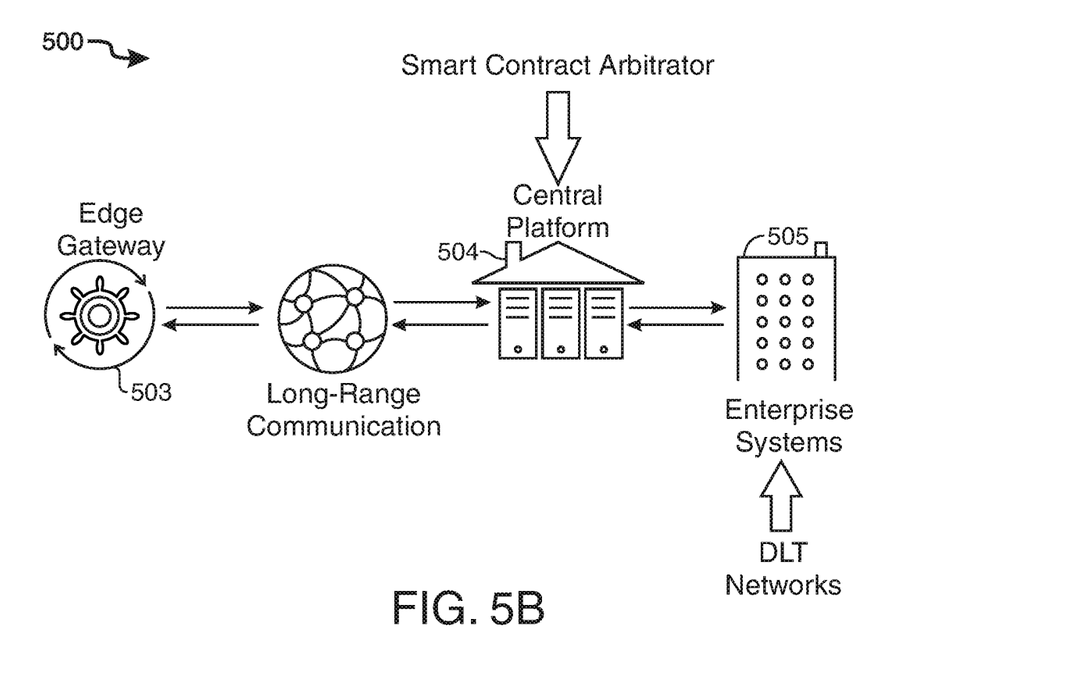

FIGS. 5A and 5B show two parts of illustrative process 500. Process 500 may include one or more elements from process 400 shown in FIGS. 4A and 4B. Process 500 may include one or more elements from process 300, shown in FIG. 3.

FIG. 5A shows events occurring at the IOT edge. Physical environment 501 includes sensors and actuators configured to detect changes in the physical environment. The IOT endpoint 502 may collect and process sensor data from the physical environment. The IOT endpoint may also relay control commands back to sensors and actuators in the physical environment.

The sensor data may be transmitted locally to edge gateway 503. Edge gateway 503 may determine routing based on the sensor data. Edge gateway 503 may include a signal context matcher. The signal context manager may include pre-defined control commands for different physical environment scenarios. The control commands may be transmitted to the IOT endpoint. For example, in response to detection of environmental temperature increase, commands transmitted back to the actuator may activate a cooling protocol.

FIG. 5B shows events occurring after the edge data is routed to a central server or cloud. The signal context matcher installed on edge gateway 503 may transmit the sensor data to central platform 504. Central platform 504 may host a smart contract arbitrator. Based on the sensor data transmitted by edge gateway 503, the smart contract arbitrator may identify a smart contract associated with the transaction partners and the asset. The arbitrator may identify a smart contract modification in response to a change in the physical environment of the asset. The smart contract modification may be transmitted to a contract reviser installed on enterprise system 505. Enterprise system 505 may be running a distributed ledger. Enterprise system 505 may be a node on a DLT network. The smart contract reviser may validate and execute smart contract code corresponding to the smart contract modification transmitted by the arbitrator. The smart contract reviser may generate a data record and append the data record to the distributed ledger in accordance with DLT network protocols.

Enterprise systems 505 and central platform 504 may be integrated. Central platform 504 may transmit enterprise instructions to edge gateway 503 to control and manage the IOT environment.

Thus, apparatus and methods for electronic arbitration of a smart contract in response to IOT sensor data are provided. Persons skilled in the art will appreciate that the present invention can be practiced by other than the described embodiments, which are presented for purposes of illustration rather than of limitation. The present invention is limited only by the claims that follow.

What is claimed is:

1. A system for modifying smart contract code in response to environmental sensor data, the system comprising:
   an internet of things ("IOT") network comprising:
      a mobile edge device, the mobile edge device comprising an environmental sensor configured to generate and transmit sensor data and a device actuator; and
      an edge gateway device configured to:
         identify a plurality of transaction partners based at least in part on the sensor data; and
         route the sensor data based at least in part on the identified transaction partners;
   a computer system running a distributed electronic ledger and configured to:
      receive the sensor data from the edge gateway device;
      based at least in part on the sensor data, identify a smart contract running on the distributed electronic ledger and configured to control interaction among the plurality of transaction partners;
      based at least in part on the sensor data, identify an environmental mitigation protocol and instruct the edge gateway device to transmit the mitigation protocol to the mobile edge device actuator;
      based at least in part on the sensor data, identify a modification to the smart contract, the modification comprising a contingency associated with success of the mitigation protocol, the contingency comprising an evaluation of an actual percentage loss at contract delivery;
      generate smart contract code corresponding to the contract modification; and
      execute the modified smart contract code on the distributed electronic ledger.

2. The system of claim 1, wherein the environmental sensor is configured to measure an audio, pressure, temperature or water level.

3. The system of claim 1, wherein the edge gateway is further configured to identify a type of transaction based at least in part on the sensor data and route the signal data based at least in part on the type of transaction.

4. The system of claim 1, wherein the computer system comprises a library of smart contract modifications each associated with a set of environmental sensor data parameters.

5. The system of claim 1, wherein the smart contract modification comprises a change to an existing smart contract term.

6. The system of claim 1, wherein the smart contract modification comprises addition of a new smart contract term.

7. The system of claim 1, wherein the computer system is further configured to communicate the smart contract modification to the plurality of transaction partners for pre-approval.

8. One or more non-transitory computer-readable media storing computer-executable instructions which, when executed by a processor on a computer system, perform a method for modifying smart contract code in response to environmental sensor data, the method comprising:
   receiving environmental sensor data routed from an edge gateway, the edge gateway comprising a signal context matcher configured to:
      receive a signal from an environmental sensor on a mobile edge device;
      based on the signal, identify transaction partner data associated with the mobile edge device;
      based on the signal, identify physical environment data associated with the mobile edge device; and
      route the transaction partner data and the physical environment data to a node in distributed ledger technology network;
   based at least in part on the transaction partner data, identifying a smart contract running on the distributed ledger;
   based at least in part on the physical environment data, identifying a physical environment remediation protocol and instructing a mobile edge device actuator to implement the remediation protocol;

based at least in part on the physical environment data, identifying a smart contract modification, the modification comprising a contingency associated with success of the remediation protocol and comprising a determination of actual percentage loss at completion of the contract;

generating code corresponding to the smart contract modification; and executing the modified smart contract code on the distributed ledger.

9. The media of claim 8, wherein the physical environment data comprises an audio, pressure, temperature or water level.

10. The media of claim 8, wherein the smart contract modification is retrieved from a library of smart contract modifications each associated with a set of physical environment data parameters.

11. The media of claim 8, wherein the smart contract modification comprises addition of a new smart contract term.

12. The media of claim 8, wherein the method further comprises transmitting the smart contract modification to one or more transaction partners for pre-approval.

* * * * *